L. ARDIN.
ENTRY SHEET FOR ARTICLES OF MERCHANDISE.
APPLICATION FILED AUG. 13, 1914.

1,222,060.

Patented Apr. 10, 1917.
2 SHEETS—SHEET 1.

Fig. 1.

Witnesses
Chas. N. Ourand
D. J. Reinohl

Inventor
Lucien Ardin
By F. Dittmar
Attorney

L. ARDIN.
ENTRY SHEET FOR ARTICLES OF MERCHANDISE.
APPLICATION FILED AUG. 13, 1914.

1,222,060.

Patented Apr. 10, 1917.
2 SHEETS—SHEET 2.

Fig. 2.

UNITED STATES PATENT OFFICE.

LUCIEN ARDIN, OF NEW YORK, N. Y.

ENTRY-SHEET FOR ARTICLES OF MERCHANDISE.

1,222,060.                    Specification of Letters Patent.    Patented Apr. 10, 1917.

Application filed August 13, 1914.   Serial No. 856,521.

*To all whom it may concern:*

Be it known that I, LUCIEN ARDIN, citizen of the United States, residing at 123 West Twenty-sixth street, New York, county of New York, State of New York, United States of America, have invented certain new and useful Improvements in Entry-Sheets for Articles of Merchandise, of which the following is a specification, reference being had therein to the accompanying drawing.

My invention relates primarily to a system of records for business transactions, such as the sale of merchandise, has for its object a concise entry of orders, sales, receipts and delivery of articles sold by the merchant; and the invention consists in certain improvements which will be fully disclosed in the following specification and claim.

In the accompanying drawings, which form part of this specification:—

Figure 1 represents a sheet on which articles of merchandise are entered and containing receipts for shipment.

Fig. 2 represents a duplicate sheet omitting the receipt of the bailee or carrier.

Reference being had to the drawings and the designating characters thereon, the numeral 1 indicates a stub adapted to be placed within the parcel to be shipped as a check upon the merchant, and upon which the name of the purchaser and the articles purchased and to be shipped are inscribed by the merchant.

2 indicates a label or receipt blank from the bailee or carrier prepared by the merchant and adapted to be pasted or atttached to one of the parcels to be shipped.

3 indicates a label formed integral with the portion 2, and on which the parcels to be shipped are entered, the value given and date of shipment recorded.

Both of these labels or receipts are detachable from the stub 1 on perforated line 4, and each sheet contains a plurality of stubs, labels or receipt blanks separable on perforated lines 5.

The sheets or leaves containing the stubs, labels or receipt blanks are assembled in book form and when used are removed from the book and placed in a temporary binder by inserting the binding member, not shown through the perforations 6 in the margin of the stubs.

On the sheet or leaf shown in Fig. 2, which is used in conjunction with the sheet shown in Fig. 1 as a carbon copy of the latter, the receipt 2 adjacent to the stub 1 is omitted, and instead thereof the space 2' is triple ruled with spaced vertical lines for the entry of the charge for the articles of merchandise, as indicated by the numeral 7.

The second sheet is retained by the merchant as a permanent record of the transaction entered, while the first sheet is subdivided according to the entries and are then forwarded with the articles as a bill of lading or instructions.

Having thus fully described my invention, what I claim is:—

In a combined loose leaf label, shipping receipt, and merchant's sales record, a pair of sheets, the upper sheet of each pair being formed of a plurality of detachable stub portions and a plurality of detachable label portions, said stub portions having appropriate lines for the entry of the several articles of merchandise thereon, and serving as a check upon the merchant when inserted within the parcel to be shipped, each of said label portions being formed of two integral sections, one of said sections to form a receipt with the signature of the carrier's agent, and the other of said sections being provided with a plurality of columns for the entry of the several parcels therein, appropriate lines for the identification of the consignee, the label to be attached to one of the parcels to be shipped, the lower sheet of each pair being divided into the same number of sections as in the upper sheet, each of said latter sections being a duplicate record of the upper sheet, said lower sheet having an intermediate section for the recording of the sale price of the several items of merchandise, and a duplicated record of the carrier agent's signature.

In testimony whereof I affix my signature in the presence of two witnesses.

LUCIEN ARDIN.

Witnesses:
  C. G. BERENDSEN,
  HENRY BLANE.

Copies of this patent may be obtained for five cents each, by addressing the "Commissioner of Patents, Washington, D. C."